United States Patent [19]
Hodges et al.

[11] 3,794,821
[45] Feb. 26, 1974

[54] MEMORY PROTECTION ARRANGEMENTS FOR DATA PROCESSING SYSTEMS

[75] Inventors: Kenneth James Hamer Hodges, Blandford Forum; Peter Charles Venton, Colehill, both of England

[73] Assignee: Plessey Handel und Investments AG, Zug, Switzerland

[22] Filed: Nov. 15, 1972

[21] Appl. No.: 306,644

[30] Foreign Application Priority Data

Nov. 17, 1971 Great Britain .................... 53310/71

[52] U.S. Cl. .................235/153 AM, 340/146.1 AL, 340/174 ED

[51] Int. Cl. ............................................ G06f 11/12

[58] Field of Search.....235/153 AM; 340/146.1 AJ, 340/146.1 AL, 146.1 AV, 174 ED, 172.5

[56] References Cited

UNITED STATES PATENTS 3,417,375 12/1968 Packard ........................... 340/172.5

FOREIGN PATENTS OR APPLICATIONS 10,932 6/1972 China /Taiwan ............ 235/153 AM

*Primary Examiner*—Felix D. Gruber
*Assistant Examiner*—R. Stephen Dildine, Jr.
*Attorney, Agent, or Firm*—Blum, Moscovitz, Friedman & Kaplan

[57] ABSTRACT

A data processing device including memory segmentation and protection arrangement of the type provided by so-called segment descriptors employing a check-code in which the check-code, after formation, is rotated by a predetermined number of bits.

1 Claim, 2 Drawing Figures

MEMORY PROTECTION ARRANGEMENTS FOR DATA PROCESSING SYSTEMS

Figure 1:
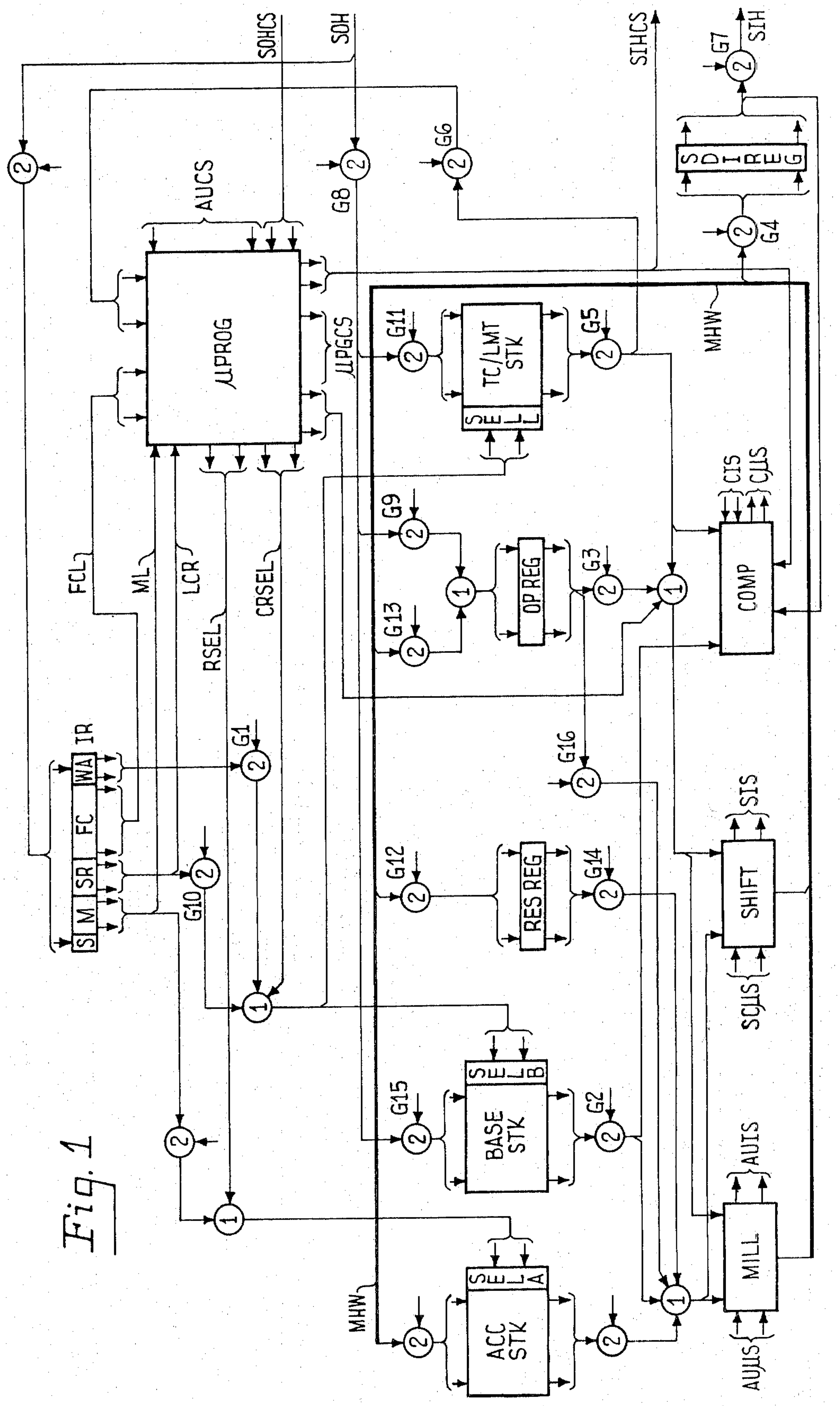

The form of data processing device to which the invention relates is described and claimed in co-pending application No. 146,334.

The present invention relates to data processing devices and is more particularly concerned with such devices which include memory segmentation and protection arrangement of the type provided by so-called segment descriptors.

In our co-pending application Ser. No. 146,334 such a device is disclosed and claimed and the present invention relates specifically to the so-called segment descriptor check-code employed therein. In a data processing device of the type contemplated in application Ser. No. 146,334 the entire information content of the memory (i.e., program instruction lists, transient data files, working data information blocks, permanent data files and the like) is sub-divided into so-called segments and each segment is defined, for protective purposes, by a so-called segment descriptor. A master capability table is provided having an entry for each information segment in the memory. Each entry comprises information indicative of the base and limit addresses of the corresponding segment together with a word storing the so-called segment descriptor check-code. This check-code word is arranged to bear a characteristic relationship to the base and limit address information of the master capability table entry and is used when the base and limit address information of the entry is copied into one of the capability registers of a central processing unit, to check the correct loading of that capability register.

Typically a "load capability register" instruction includes the steps of (a) accessing the master capability table at the required entry, (b) extracting the check-code word, the segment base address and the segment limit address, (c) loading the capability register with the base and limit addresses, (d) forming a local check-code word and (e) comparing the locally formed check-code word with the check-code word extracted from the master capability table entry. Any discrepancy between the locally generated check-code word and that extracted from the master capability table entry is used to set a capability sum-check violation fault-indicator which in turn may be used to generate a fault interrupt. Nominally the setting of the capability sum-check violation fault-indicator indicates an incorrectly loaded capability register, however, the sum-check mechanism may also be used to provide security against other faults in the processor unit. It is possible for a check-code violation indication to occur although the selected capability register has been correctly loaded. For example, a fault in the processor arithmetic unit may occur causing the locally generated check-code to be in error The fault interrupt generated, although nominally indicating an incorrectly loaded capability register, may now be used to diagnose the fault. It is arranged that a substantial part of the operational paths of a processor unit are involved in the load capability register instruction operation and consequently the sum check-code mechanism provides a significant security aid in the protection of these operational paths.

One very significant and important path which is not fully covered by the sum check-code mechanism as disclosed in application Ser. No. 146,334 is the parallel path over which data is passed from the memory to the processor unit. Errors on this path in certain circumstances may modify the base address or limit address and the sum check-code in such manner that the sum check-code appears to be valid although the capability register has been loaded with incorrect information. Typically a one bit failure to zero of one lead in the path will modify a "one" bit to a zero bit of each word passed thereover. Hence, if such a failure occurs and that ordered bit in the base address or limit address, as stored in the master capability table, is a 1 the capability register will be loaded with an incorrect descriptor. This condition of fault will not be detected in the load capability register instruction as the sum check-code value will also be modified by the fault and consequently, the locally generated sum check-code will equate to the fault modified sum check-code.

It is a prime object of the present invention to extend the protection arrangements provided by the sum check-code mechanism incorporated in a data processing system of the type defined in co-pending application Ser. No. 146,334 to other parts of the data processing system, particularly to the path between the memory and the processor unit, in a simple and, consequently, inexpensive manner.

The invention contemplates the rotation of the sum-check word of each entry of the master capability table by a predetermined number of bits.

Rotating the check-code, after its formation, requires the information stored in the master capability table entry to be restored to its correct order, by rotation in the opposite direction, when that information is fed into the processor unit. Consequently, one bit failures of the type defined above, although effecting the same ordered bit in the base and limit addresses, effect a different ordered bit in the sum check-code when restored.

Figure 2:
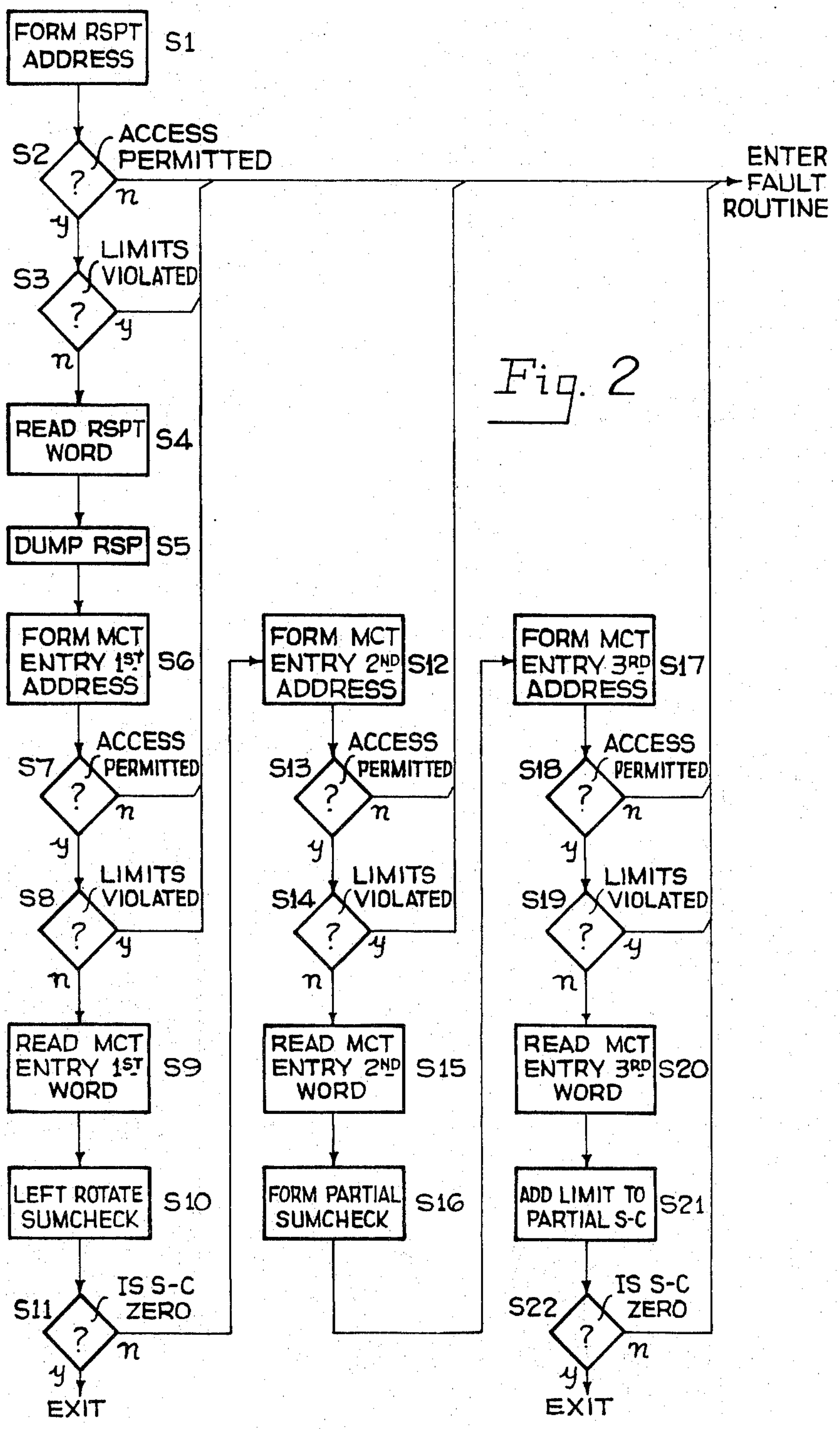

The invention will be more readily understood from the following description of one embodiment thereof which should be read in conjunction with the accompanying drawings. Of the drawings:

FIG. 1 shows a block diagram of a central processing unit suitable for the incorporation of one embodiment of the invention while FIG. 2 shows a flow diagram of a "load workspace capability register" instruction.

FIG. 1 shows a block diagram of a central processing unit similar to that shown in our co-pending application Ser. No. 146,334. Most of the equipment shown in FIG. 1 corresponds with that shown in FIGS. 1*a* and 1*b* of co-pending application Ser. No. 146,334 and consequently, identical references for the register stacks ACC STK, BASE STK, TC/LMT STK, the registers SDI REG, RES REG, OP REG and IR, the micro-program control unit uPROG, the arithmetic unit MILL and the comparator COMP have been employed. The major difference between the central processing unit of the parent application Ser. No. 146,334 and the central processing unit of the present application concerns the inclusion of a logic/arithmetic shifter unit SHIFT which is a special purpose hardware unit capable of performing shifts and rotations under the control of micro-program signals SCuS.

The features of the present invention are best described in connection with a "load workspace capability register" instruction a flow diagram of which is shown in FIG. 2. It should be noted that the steps shown in FIG. 2 accord closely with those of FIG. 6 of the parent application Ser. No. 146,334 the differences being mainly due to the features of the embodiment of the present invention. The following description will show how the "load workspace capability register" instruction is executed by the equipment of FIG. 1 and it should be pointed out that those operations which are common to the two flow diagrams will not be handled in the same detail as those which are introduced by the embodiment of the present invention.

The flow diagram of FIG. 2 commences at step S1 after the next instruction word has been extracted from the memory. The instruction word offset $x$, modified if required, will be resident in the operand register OPREG whereas the administration fields (S, M, SR, FC and WA) of the instruction word will be resident in the instruction register IR. The offset $x$, in the operand register OPREG, defines the offset down a reserved segment pointer table at which a segment pointer is stored which is relative to the base address of the master capability table. The administration fields of significance to this description define (a) the capability register which relates to the reserved segment pointer table (capability register selection field WA), (b) the "load capability register" instruction (function code field FC) and (c) the capability register to be loaded (register selection field SR).

STEP S1 — FORM RSPT ADDRESS

The micro-program control unit uPROG produces micro-program control signals uPGCS, which causes gates G1, G2, G3 and G4 to be opened and an add operation to be performed by the arithmetic unit MILL. Gates G1 apply the WA administration field to the selection circuits SELB of the base stack BASE STK to select the base half of the capability register which relates to the reserved segment pointer table. In the parent application Ser. No. 146,334 it was assumed that working capability register WCR 6 is defined by the WA field and it will, therefore, be similarly assumed in this description. Consequently, the arithmetic unit MILL forms, in the memory input register SDI REG, the actual memory address of the reserved segment pointer required, by adding the base address of the reserved segment pointer table in capability register WCR 6 to the modified offset $x$ in the operand register.

STEP S2 — ACCESS PERMITTED?

In this step the micro-program control unit uPROG by opening gates G1, G5 and G6, constructs an access code on the memory input control signal highway SIHCS which is checked in the comparator COMP with the type-code of capability register WCR 6. The type-code defines that the segment is a reserved segment pointer table and consequently, in this instruction read operations only are permitted.

STEP S3 — LIMITS VIOLATED?

In this step the micro-program control unit uPROG opens gates G1, G2 and G5 and instructs the comparator COMP to check that the address resident in register SDI REG lies within he bounds of the reserved segment pointer table as defined by the segment descriptor in workspace capability register WCR 6.

STEP S4 — READ RSPT WORD

This step comprises the constituent sub-steps of (i) accessing the memory for a READ operation at the address defined by step S1 and (ii) extracting the pointer and type code information from that address. The first sub-step is performed by the micro-program control unit activating the timing wire of the control signal highway SIHCS and opening gate G7. The second sub-step is actioned by the activation of the timing wire of the control signal highway SOHCS and the micro-program control uPROG responds by activating gates G8, G9 G10 and G11.

STEPS S5 — DUMP RSP

This step is identical with that of sub-step (iii) of step S7 in the parent application on Ser. No. 146,334 and effectively the reserved segment pointer in the operand register OPREG is written into the dump stack for the current process at the location reserved for capability register WCR 2.

STEP S6 — FORM MCT ENTRY FIRST ADDRESS

In this step the micro-program control unit uPROG applies to leads CRSEL a code defining the master capability table capability register MCR, opens gates G2, G3, G4 and G12 while instructing the arithmetic unit to perform an add operation. Accordingly, the first address of the required three-word entry in the master capability table is formed in the memory input register SDI REG and the result register RES REG.

STEP S7 — ACCESS PERMITTED?

The micro-program control unit generates control signals in this step to cause the comparator COMP to check the type code of the master capability table against the accesses requested.

STEP S8 — LIMITS VIOLATED?

In this step the address in register SDI REG is tested to see if it lies within the limits of the master capability table segment by the comparator COMP.

STEP S9 — READ MC ENTRY FIRST WORD

Two sub-steps are involved in this step (i) the memory is accessed for a read operation at the first word (rotated sumcheck word) of the required entry in the master capability table and (ii) the rotated sum-check word is extracted from the memory. The first sub-step is performed under the control of the micro-program control unit uPROG by activating the timing wire of the control signal highway SIHCS and opening gates G7. The second sub-step is initiated by the activation of the timing wire of the control signal highway SOHCS and the micro-program control unit responds by activating gates G8 and G9.

STEP S10 — LEFT ROTATE SUM-CHECK

In this step the rotated sum-check code, fed into the operand register OPREG in the previous step, is left circulated by eight bits. The sum-check code when formed, at the compilation of the master capability table or when the master capability table is up dated after segment relocation, is right circulated by eight bits before storage in the first word of the master capability table entry. Consequently, the left circulation by eight bits performed in this step restores the rotated sum-check code in the operand register to its true sum-check state. To perform the step the micro-program control unit uPROG opens gates G3 and G13 and instructs the shifter unit SHIFT to perform an eight bit left rotation.

STEP S11 — IS S-C ZERO?

While the rotated sum-check word (S-C) is being circulated by eight bits in the previous step it is tested by special hardware in the shifter for the "all zero" state. The all zero state has no significance to this description and consequently, it will be assumed that the sum-check is not zero.

STEP S12 — FROM MCT ENTRY 2ND ADDRESS

In this step the micro-program control unit uPROG opens gates G14, G4 and G12 and instructs the arithmetic unit MILL to "add one" to the applied data word to form the next master capability table entry address in the memory input register SDI REG.

STEP S13 — ACCESS PERMITTED?

This step is the same as step S7.

STEP S14 — LIMITS VIOLATED?

This step is the same as step S8.

STEP S15 — READ MCT ENTRY 2ND WORD

This step consists of two sub-steps involving (i) memory access for a read operation at the second word or "base address" entry and (ii) the loading of the base half of the capability register with the base address of the required segment descriptor. The first sub-step is performed by opening gates G7 and activating the timing wire of the control signal highway SIHCS. The second sub-step is performed by opening gates G8, G10 and G15.

STEP S16 — FORM PARTIAL SUM-CHECK

In this step the micro-program control unit uPROG opens gates G10, G2, G15 and G13 and instructs the arithmetic unit to perform a subtract operation. Consequently, the restored sum-check value is subtracted from the newly received base address value.

STEP S17 — FORM MCT ENTRY 3ND ADDRESS

This step, which is the same as step S12, forms the address of the third entry word or limit address of the required segment descriptor entry in the master capability table in register SDI REG.

STEP S18 — ACCESS PERMITTED?

This step is the same as steps S13 and S7.

STEP S19 — LIMITS VIOLATED?

This step is the same as steps S14 and S8.

STEP S20 — READ MCT ENTRY 3RD WORD

In this step the limit address of the segment descriptor is read into the limit half of the capability register to be loaded.

STEP S21 — ADD LIMIT TO PARTIAL S-C

In this step the micro-program control unit uPROG opens gates G10, G5 and G15 and instructs the arithmetic unit to perform an add operation. This causes the limit address, received in step S20, to be added to the partial sum-check derived in step S16. Consequently, the combined effect of step S16 and this step is to form the result of the base address value minus the restored true sum-check value plus the limit address value. This result should of course be zero if the capability register has been correctly loaded. Step S22 tests for the zero state and generates a fault indication if the result is not zero.

It should be realised that the rotation arrangement employed in the above description ensures that certain failures on the memory output highway SOH cannot be masked. For example, consider a segment descriptor having a base address of 001001, a limit address of 000100 and a consequential sum-check value of 001101. In equipment in accordance with the parent application Ser. No. 146,334 a failure to 0 for exaple of the least significant bit of the memory output path will not be detected when the capability register is loaded. The base address fed into the capability register under these circumstances will be 001000, the limit address will be 000100 whereas the sum-check value will be 001100. The locally generated sum-check value generated in the "load capability register" instruction will be 001100 which of course equates to the fault modified sum-check read in. The capability register, however, has been loaded with an incorrect base address.

By using the rotation technique of the invention the above problems are removed. Taking the same values as shown above the base and limit addresses fed into the capability register remain the same however, the sum-check is rotated before storage in the MCT entry. It will be assumed that a three bit left rotation is employed. Consequently the MCT stored sum-check will be 101001. The information applied to the processor unit, with the same assumed fault condition, will result in the capability register to be loaded having a base address of 001000 and a limit address of 000100 as before, however, the sum-check value as read in will be 101000 which when right rotated by three bits will be 000101. A sum-check violation will now be detected causing the capability sum-check violation fault indicator to be activated.

The above examples have used simplified values for ease of presentation, however, the comments are equally valid for any size of data word and any number of bits of rotation. Indeed the description in step S16 discloses the use of an eight bit right rotated sum-check word and it should be realised that such a rotation is not limiting to the invention. Also the above description, at step S16, uses the sum-check value derived from the master capability table to form a partial sum-check value whereas the parent application uses the technique of forming a local sum-check for comparison with the master capability table entry sum-check value. This latter technique may similarly be used in the present invention without departing from the spirit thereof. Similarly other alternative arrangements will be seen by those skilled in the art and it is therefore, not to be construed that the present invention is limited by the specific techniques described.

We claim:

1. A time-sharing data processing system comprising a central memory arranged to store information in segments and at least one processing unit including a plurality of capability register means each arranged to store segment descriptor information indicative of the base and limit memory addresses of an information segment together with access-type information indicative of the permitted mode of access which may be made to the segment defined by the base and limit addresses, each said processing unit including means for performing a load capability register instruction whose instruction word contains information defining (a) the identity of a capability register means to be loaded, (b) the identity of a first one of said capability register means and (c) an offset value, each said processing unit further including:

i. a first one of said capability register means arranged to hold a first segment descriptor relative to an information segment which contains a reserved segment pointer table particular to a program currently being executed by said processing unit, ii. a second one of said capability register means arranged to hold a second segment descriptor relative to an information segment which contains a master capability table, said master capability table having an entry for each information segment in said central memory and each entry including information defining the base and limit addresses of a segment together with a segment descriptor check-code which is the sum of the addition of the base and limit memory addresses of the same entry rotated in a first direction by a predetermined number of bits, said reserved segment pointer table comprising a list of data words which are used as pointers to define different entries in said master segment table, each of said data words in said reserved segment pointer table being accompanied by permitted access-type information, iii. capability register loading means comprising;

first means for forming an address of a pointer word in said reserved segment pointer table by adding said offset value to the base address held in said first one of said capability registers;

second means for reading a data word from the formed address in said reserved segment pointer table;

third means for inserting the permitted access type information read from said pointer word into said capability register means to be loaded;

fourth means for forming an entry address in said master capability table by adding the pointer word read from said reserved segment pointer table to the base address held in said second one of said capability register means;

fifth means for reading the base and limit information from the entry addressed by said fourth means in said master capability table into the capability register means to be loaded;

iv. means for reading said check-code and rotating it by a predetermined number of bits in opposition to said first direction, v. means for forming a local check-code bearing a predetermined relation to the base and limit addresses loaded into said capability register to be loaded, and vi. means for comparing the rotated check-code with said local check-code.

* * * * *